United States Patent
Takahata (10) Patent No.: US 7,949,467 B2
(45) Date of Patent: May 24, 2011

(54) ROAD MAP DATA STRUCTURE, ROAD MAP DATA STRUCTURE CREATING METHOD, ROAD MAP DATA STORAGE MEDIUM, AND NAVIGATION DEVICE

(75) Inventor: Seiji Takahata, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 550 days.

(21) Appl. No.: 12/000,633

(22) Filed: Dec. 14, 2007

(65) Prior Publication Data

US 2008/0162039 A1    Jul. 3, 2008

(30) Foreign Application Priority Data

Dec. 27, 2006  (JP) ................................ 2006-351618

(51) Int. Cl.
*G01C 21/30*  (2006.01)
(52) U.S. Cl. ... 701/208; 701/211; 701/212; 340/995.15; 340/995.27
(58) Field of Classification Search .................. 701/201, 701/208, 211–212; 340/988, 995.15, 995.18, 340/995.27
See application file for complete search history.

(56) References Cited

U.S. PATENT DOCUMENTS

| | | | | |
|---|---|---|---|---|
| 6,668,227 B2 * | 12/2003 | Hamada et al. | ............... | 701/208 |
| 2005/0058155 A1 | 3/2005 | Mikuriya et al. | | |
| 2005/0125145 A1 * | 6/2005 | Sakashita et al. | ............ | 701/208 |
| 2008/0091344 A1 | 4/2008 | Mikuriya et al. | | |

FOREIGN PATENT DOCUMENTS

| | | |
|---|---|---|
| JP | A 2002-175593 | 6/2002 |
| JP | A 2005-70482 | 3/2005 |
| WO | WO 2006/085412 A1 | 8/2006 |

* cited by examiner

Primary Examiner — Gertrude Arthur Jeanglaud
(74) Attorney, Agent, or Firm — Oliff & Berridge, PLC (57) ABSTRACT

Systems, methods, and programs create a road map data structure, the data structure including road network data in which a road is represented by a plurality of links connected in a link string. The systems, methods, and programs assign a link ID to each of the links of the road network data. For each link, the link ID has a numerical range set in accordance with both a length of the link and a road attribute, and the link ID is set sequentially in a connection order within the link string.

26 Claims, 6 Drawing Sheets

| CATEGORY ATTRIBUTE | COEFFICIENT |
|---|---|
| MAIN ROAD OF HIGHWAY | 0.3 |
| SIDE ROAD OF HIGHWAY | 0.6 |
| GENERAL ROAD | 1 |

| AREA ATTRIBUTE | COEFFICIENT |
|---|---|
| URBAN AREA | 1 |
| LOCAL AREA | 0.7 |

ROAD MAP DATA STRUCTURE, ROAD MAP DATA STRUCTURE CREATING METHOD, ROAD MAP DATA STORAGE MEDIUM, AND NAVIGATION DEVICE

INCORPORATION BY REFERENCE

The disclosure of Japanese Patent Application No. 2006-351618, filed on Dec. 27, 2006, including the specification, drawings and abstract is incorporated herein by reference in its entirety.

BACKGROUND

1. Related Technical Fields

Related technical fields include road map data structures, for example, used in a navigation device. Related technical fields also include computer-readable data storage mediums and navigation devices that store and/or use road map data structures.

2. Description of the Related Art

Displaying a vehicle location and guiding a vehicle along a route to the destination by means of digital road map data is known. Generally, such road map data contains road network data at plural levels corresponding to the level of detail or the scale for the display of the road information. The road network data includes a plurality of links. Generally, link IDs (which identify the links) are sequentially provided in connection order along a link strings, in which each link has a common attribute. Link IDs structured to have a predetermined numerical range, which contains plural successive numbers is known. In Japanese Patent No. 3725022 and Japanese Patent Application Publication No. JP-A-2005-70482, a range proportional to each link length is set to the numerical range of the link ID.

In the road map data structure as described above, the link ID has a predetermined numerical range. When updating the road network data by dividing the existing link into plural sections for connecting a new link to the intermediate point of the existing link, the continuity of the link IDs sequentially arranged in the order of connection may be maintained. In the aforementioned case, the numerical range of the link ID of the existing link is divided to newly generate plural link IDs so as to be assigned to the respective divided sections of the that existing link.

SUMMARY

In the aforementioned road map data structure, the many links that form the road network are required to be identified by the link IDs. In order to allow the link IDs to have numerical ranges, the number of digits required for the link ID becomes increasingly large. As the digit of the numerical range of the link ID is increased, the data bit number representing the link ID is required to be large, thus making the data size for representing the link ID unnecessarily large. In the case where each numerical range of the respective link IDs is set to be small for reducing the digit number thereof, multiple division of the specific link is not allowed for the prospective updating of the road network data, and it is not possible to maintain the continuity of link IDs.

Various exemplary implementations of the broad principles described herein provide a road map data structure capable of appropriately: setting the numerical range of each link ID of the respective links, ensuring sufficient dividing the respective links while maintaining the continuity of the link IDs, and keeping the data size for representing each link ID of the respective links as small as possible.

Various exemplary implementations provide systems, methods, and programs that create a road map data structure, the data structure including road network data in which a road is represented by a plurality of links connected in a link string. The systems, methods, and programs may assign a link ID to each of the links of the road network data. For each link, the link ID may have a numerical range set in accordance with both a length of the link and a road attribute, and the link ID may be set sequentially in a connection order within the link string.

BRIEF DESCRIPTION OF THE DRAWINGS

Exemplary implementations will now be described with reference to the accompanying drawings, wherein.

DETAILED DESCRIPTION OF EXEMPLARY IMPLEMENTATIONS

Figure 1:
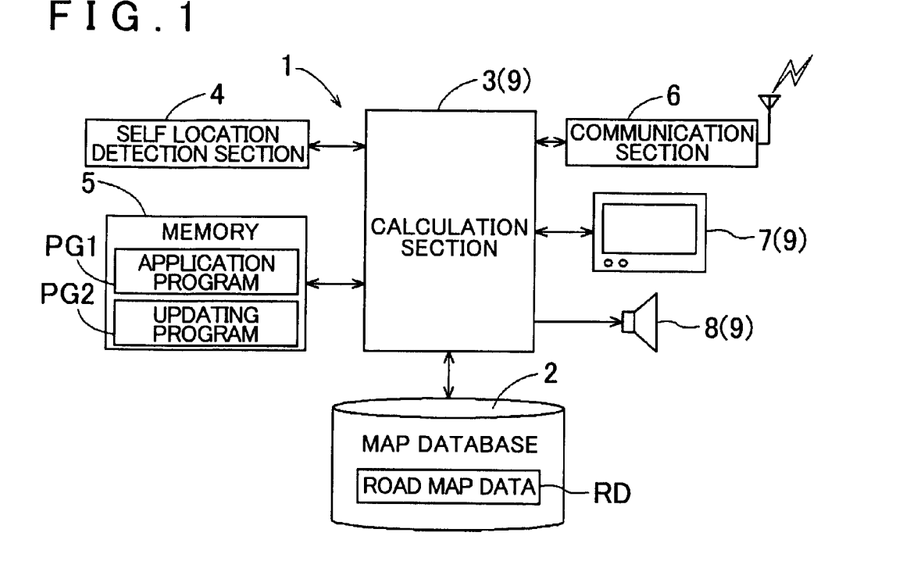
FIG. 1 is a block diagram schematically showing a structure of an exemplary navigation device.

FIG. 1 is a block diagram schematically showing the structure of an exemplary navigation device 1. The navigation device 1 may be structured to perform general navigation functions, such as, displaying a location, searching for a route from a current position to a destination, guiding along the route to the destination, retrieving the destination, and the like. Referring to FIG. 1, the navigation device 1 may physically, functionally, and/or conceptually include a map database 2, a calculation section 3 (acting as a controller), a self location detection section 4, a memory 5, a communication section 6, a display input section 7, and a voice output section 8. These sections may be formed by hardware and/or the software (program) for executing various types of the process with respect to the input data, having the calculation section 3 $f$ as the core component. The calculation section may include a CPU (Central Processing Unit) as a main component.

The map database 2 may store road map data RD to which, for example, the calculation section 3 refers in accordance with the application program PG1 to be described later. The map database 2 may have a hardware structure including a writable storage medium such as a hard disk drive and/or a flash memory, and a drive unit for driving the storage medium. The road map data RD stored in the map database 2 may be stored according to a particular data structure.

Besides the road map data RD, the map database 2 may store various data (guiding data) for displaying, guiding, and/ or searching using the map data RD. Specifically, the aforementioned guiding data may include image data, voice data, POI (Point of Interest) and the like, each data of which are stored in correlation with the link and node (see FIG. 3) contained in the road map data RD. The structure of the road map data RD will be described in detail referring to FIGS. 2 and 3.

As used herein, the term "link" refers to, for example, a road or portion of a road. For example, according to one type of road data, each road may consist of a plurality of componential units called links. Each link may be separated and defined by, for example, an intersection, an intersection having more than three roads, a curve, and/or a point at which the road type changes. As used herein the term "node" refers to a point connecting two links. A node may be, for example, an intersection, an intersection having more than three roads, a curve, and/or a point at which the road type changes.

Figure 2:
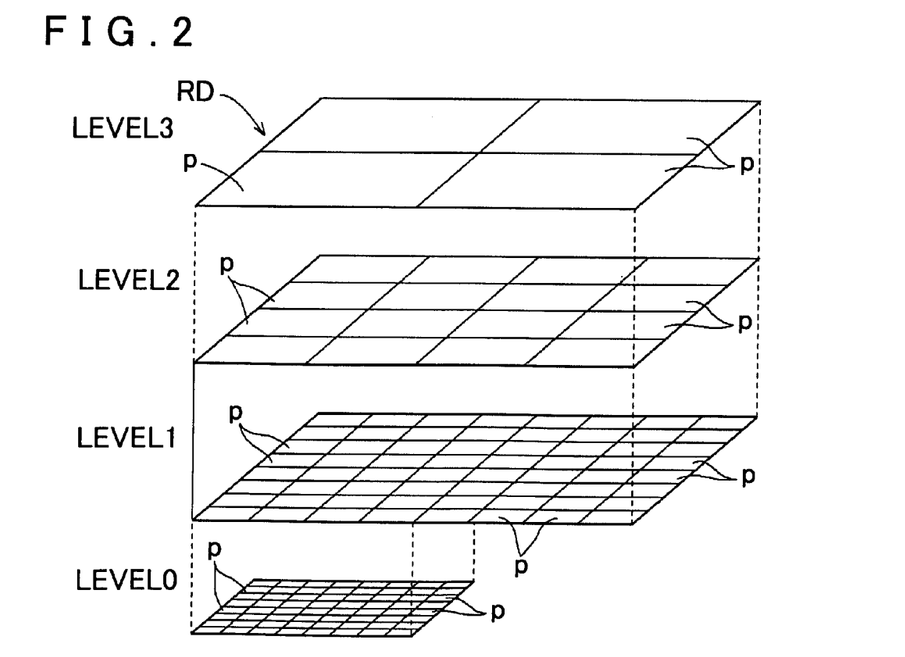
FIG. 2 is a view showing an exemplary layer structure including plural sections that form road map data.

FIG. 2 is an explanatory view showing the layer structure with respect to plural sections p, which form the road map data RD. Referring to FIG. 2, the road map data RD may include plural levels. The map data at the respective levels may be divided into plural sections p corresponding to the level. As the level becomes high, the section p corresponds to the wider area. Thus, the section p at the high level contains the area corresponding to the plural sections p at the lower level. In this example, the road map data RD includes four levels from the lowest level 0 to the highest level 3. The map data at the lowest level 0 may be used to form maps of urban areas, because it covers the road in more detail, which is necessary for urban areas. The map data at the level from 1 to 3 includes main road network data Rn used for the route search and the like.

Figure 3:
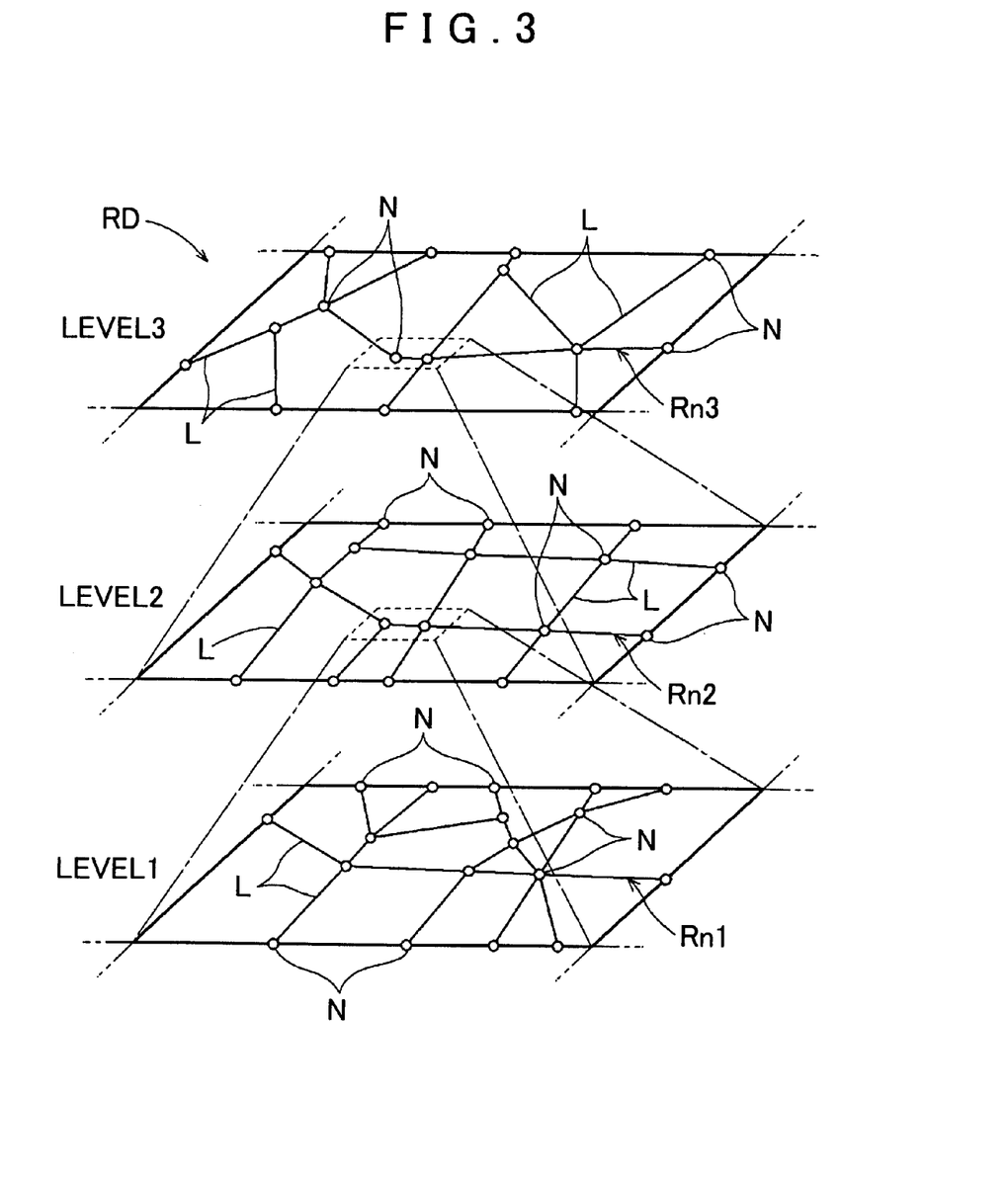
FIG. 3 is a view showing an exemplary correlation of road network data among plural levels.

FIG. 3 shows an example of the correlation of the road network data Rn among the respective levels 1 to 3 of the road map data RD. Referring to FIG. 3, in the road map data RD, the map data at the plural levels are provided with road network data Rn (Rn1 to Rn3, having different detail and display scale) in the layer structure. The road network data Rn graphically represents the actual road in connection with the plural links L. In this example, the road network data Rn has three levels from the lowest level 1 to the highest level 3. The single section p at the high level contains the area corresponding to the plural sections p at the lower level.

The road network data Rn is structured such that plural links L are connected with one another via nodes N at the respective ends of the links L. Each of the nodes N is set corresponding to the intersection on the actual road. Each of the links L is set corresponding to the road between the respective intersections. When the link L goes beyond the boundary of the section p, a dummy node may be set on the boundary of the subject section p irrespective of the intersection on the actual road. Thus the nodes N may be composed of two types: the actual node set corresponding to the intersection on the real road, and the dummy node set virtually set on the boundary of the section irrespective of the actual intersection. Herein, both nodes will be generically referred to as nodes N.

The road network data Rn at the respective levels will be generically referred to as the "Rn." The road network data may be coded as "Rn1" to "Rn3" corresponding to the levels 1 to 3 for the purpose of distinguishing the level. As the level of the road network data Rn becomes lower, the road information becomes more detailed. The road network data Rn1 at the lowest level 1 may contain information with respect to the roads which cover all road categories of the road map data, such as, highways (including the main road and side road), national roads, principal prefectural roads, prefectural roads, other main numbered roads, narrow streets, and the like.

The road network data Rn2 and Rn3 at the levels 2 and 3 may omit information with respect to one or more of the road categories considered insignificant for searching a route within that level. For example, road network data Rn2 may omit one or two of the lower level road categories (e.g., narrow streets), while the road network data Rn3 may include, for example, only highways, national roads, and principal prefectural roads.

Figure 4:
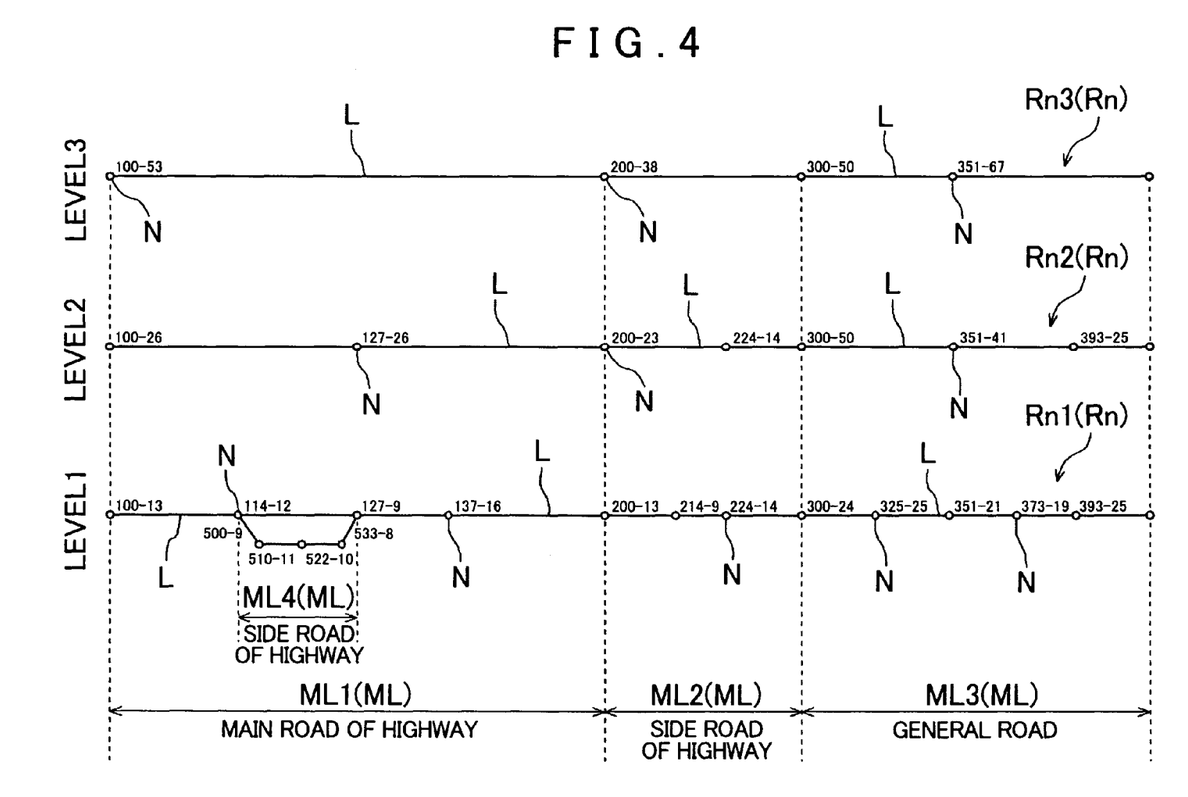
FIG. 4 is a view showing an exemplary setting of each link ID of links at plural levels.

The information data representing the nodes N and links L of the road network data Rn may be arranged by link strings ML, containing multiple links (see FIG. 4). Each link string ML may have a common road attribute and may be formed of plural links connected in a line in the order of connection in the link string ML at a particular road network data level. In this example, the name of the actual road, for example, "national road 1" or "Meishin Expressway" may be used as the common road attribute which specifies the respective link string ML. The links L corresponding to a same road thus form a long link string ML within the section p. The common road attribute which may be used to specifies a link string ML need not be limited to the road name, but various road attributes with respect to the road or the link, for example, the road category, number of lanes, road width and the like may be alternatively or additionally employed.

The road network data Rn may contain attribute information data with respect to the link L and the node N by each link string ML. Attribute information of a node N may contain coordinate information showing the coordinate of the node N, information showing whether the node is a dummy node or an actual node, information showing traffic regulation, information showing a highest road network data level where the respective node exists, information showing a presence or absence of a traffic light, and the like.

Attribute information of a link L may contain link ID information showing a link ID of the link (described later), configuration information showing a configuration of the link L, information showing traffic regulation, information showing a road category, road name information, information showing a road width, information of a number of lanes, information showing a highest road network data level where the link exists, and the like.

A link ID may be assigned to each of the links L in the road map data RD as an exclusive ID (identifier) for identifying the link so as not to be overlapped. The road map data RD may be structured to have a numerical range for each link L of the road network data Rn, which may be set in accordance with a link length of the link L and a road attribute. The link ID may be set to be sequential in the order of the connection of the links L in the link string ML. An example of the structure of the aforementioned link ID will be described in detail below.

FIG. 4 shows an example of the link IDs of the respective links L, which form the road network data Rn1 to Rn3 at the respective levels. Referring to FIG. 4, a predetermined numerical range including plural successive numbers may be assigned to the link ID of the link L. The link ID with the numerical range is represented by combining the first number and the difference between the first and the last numbers of the link ID. For example, in the case where the numerical range of the link ID is expressed as "100-13," the number "100" is the first number, and the "13" is the difference between the first and the last numbers. Accordingly, the sequential numerals ranging from 100 to 113 (natural numbers herein) with the numerical range of "14" is assigned as the link ID. The method for setting the numerical range of the link ID will be described in detail later.

In the example shown in FIG. 4, the link string ML formed of plural links L connected in line includes a first link string ML1, a second link string ML2, a third link string ML3, and a fourth link string ML4. Herein, the respective link strings are generically referred to as the code "ML." The codes of "ML1" to "ML4" will be used for distinguishing the respective link strings ML.

Each of the link IDs of the respective links L may be set to be sequential with respect to the strings ML1 to ML4 in the order of connection therein. The link IDs of the respective links L in the first link string ML1 of the road network data Rn1 at the level 1 includes "100-13," "114-12," "127-9," and "137-16" sequentially from the head of the link L (the leftmost link L shown in FIG. 4). As discussed above, the aforementioned link IDs may be expressed as the numerals as "100-113," "114-126," "127-136," and "137-153," respectively. The link IDs may be set such that the numbers are sequentially arranged in the order of connection in the link string ML1.

In the road network data Rn2 and Rn3 (at the levels 2 and 3 higher than the level 1), the plural links L at the lower level are combined into the single link L. The link ID of the thus combined link L is set as the one obtained by combining the link IDs of the respective links L before the combination. For example, in the first link string ML1 of the road network data Rn2 at the level 2, the link ID of the link L at the level 2 is formed by combining two links L each having the link ID from "100-13" and "114-12" at the level 1 to "100-26" at the level 2. The link ID of the link L at the level 2 is formed by integrating two links L each having the link ID of "127-9" and "137-16" at the level 1 to "127-26" at the level 2. The aforementioned structure of the link ID, for example, allows the link L at the lower level to be easily correlated with the link L at the higher level based on the link ID.

The method for setting the numerical range of the link ID will now be described. In this example, the numerical range of the link ID may be set based on a value obtained by multiplying each link length of the links by an attribute coefficient determined by a road attribute of the link. A category attribute with respect to the road category, and an area attribute with respect to an area where the respective links exist may be used as the road attribute. A category attribute coefficient Ca determined in accordance with the category attribute and/or an area attribute coefficient Cb determined in accordance with an area attribute may used as the attribute coefficients. The numerical range R of the link ID is then obtained by calculation of the following equation (1).

$$R = S \times LL \times Ca \times Cb \quad (1)$$

where "S" denotes a reference number representing the reference numerical range per a unit link length. In this example, the reference number S is set in reference to the numerical range suitable for the link L under the condition where the category attribute is the "general road," and the area attribute is "urban area" (to be described later). For example, the reference number may be set to "20" per link length of 100 m. The "LL" denotes the link length indicating the actual length of the link L. As described above, the link length information may be contained in the road network data Rn as the attribute information of the respective links L.

The link ID of the link L is determined by the numerical range R obtained by the aforementioned equation (1) and the first number. In the case where the first number is "100," and the numerical range R is "14," the link ID becomes "100-13." The first number of the link ID is the number (natural number) after the last number of the previous link ID in the link string ML. In other words, the first number of the link ID of the link L after the link ID of "100-13" is "114." In the link L at the head of the link string ML, the first number of the link ID is set such that the link IDs of all the links L which form the link string ML are not overlapped with those in another link string ML. The numerical range of the link ID is set with respect to the road network data Rn1 at the level 1 as being the lowest based on the aforementioned rule. The link ID formed by integrating the link IDs of the link L at the level 1 may be assigned to the road network data Rn2 and Rn3 at the higher levels 2 and 3, respectively.

Figure 5:
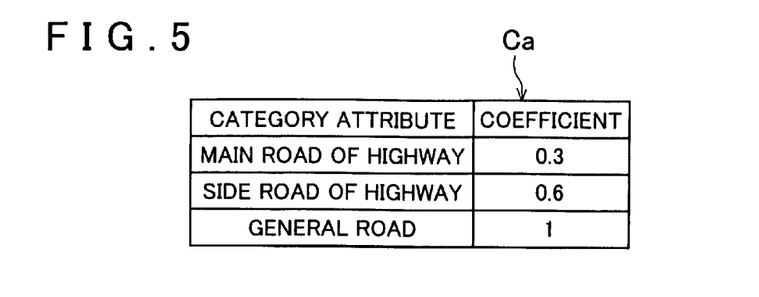
FIG. 5 is a view showing exemplary data of category attribute coefficients corresponding to attribute sections.
Figure 6:
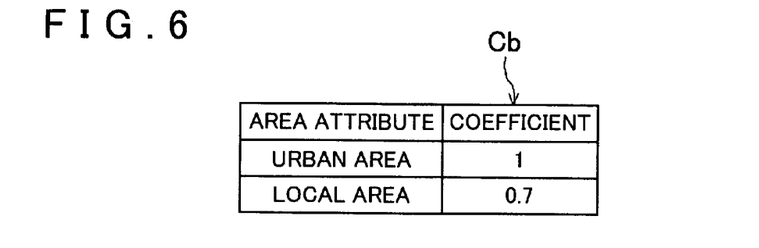
FIG. 6 is a view showing exemplary data of the area attribute coefficients corresponding to the attribute sections.

The category attribute coefficient Ca and the area attribute coefficient Cb are preliminarily set for plural attribute sections divided in accordance with the respective road attributes (category attribute or area attribute). The category attribute coefficient Ca and the area attribute coefficient Cb are set to values determined in accordance with the possibility that the link L is divided by updating of the road network data Rn with respect to the respective attribute sections. FIG. 5 shows exemplary attribute sections and corresponding category attribute coefficients Ca. FIG. 6 shows exemplary attribute sections and corresponding area attribute coefficients Cb.

Referring to FIG. 5, the road category may be divided into three sections, that is, "main road of highway," "side road of highway," and "general road" as category attribute section with respect to the category attribute. The category attribute coefficients Ca of the respective category attribute sections may be set to the values which become larger in the order of the "main road of highway," "side road of highway," and "general road," that is, "0.3," "0.6," and "1," respectively. The section of the "main road of highway" may include links L that form, for example, the main road of a highway or a toll road. The section of the "side road of highway" may include links L that form an interchange, a service area, and/or a parking area, as well as a path connecting the main road of highway to the aforementioned facilities.

The section of the "general road" may include all the links L that do not belong to the sections of the "main road of highway" and the "side road of highway." Specifically, the link L for forming the national road, principal prefectural road, prefectural road, other main numbered road, and the narrow street may be included.

A new road is not connected to the road of the category belonging to the section of the "main road of highway" unless an interchange, service area, parking area, and the like are newly built. Accordingly, the possibility that the link L belonging to the aforementioned section is divided by updating of the road network data Rn is relatively low. The possibility that a road is newly connected to the road of the category belonging to the "general road" is comparatively high. The possibility that the road is newly connected to the road of the category belonging to the "side road of highway" is comparatively, at a medium level between the levels of the "main road of highway" and the "general road." Depending on the possibility that the link L is divided by updating of the road network data Rn with respect to the category attribute section, the category attribute coefficient Ca is set to the larger value as the possibility becomes high.

Referring to FIG. 6, the area may be divided into two sections, that is, "urban area" and "local area" as the area attribute section. The area attribute coefficients Cb for the area attribute sections are set to the larger values in the order of the "local area" and "urban area," that is, "0.7" and "1," respectively. The determination whether a link L belongs to the "urban area" section or the "local area" section may be made based on at least a part of the link L being contained in the area on the map which has the map data for forming the urban area map at the level 0. The determination may be easily made because the urban area map covers only the urban area rather than the entire area of the road map data RD.

Generally, a frequency of updating roads belonging to the "urban area" section is higher than that of updating roads belonging to the "local area" section. Thus possibility that the link is divided by updating of the road network data resulting from newly connected road in an urban area is relatively high. The area attribute coefficient Cb is set to the larger value as the possibility that the link L is divided by updating of the road network data Rn with respect to the area attribute section becomes high.

In the example shown in FIG. 4, the category attribute sections of the links L that forms the respective link strings ML include the "main road of highway" as the first link string ML1, the "side road of highway" as the second link string ML2, the "general road" as the third link string ML3, and the "side road of highway" as the fourth link string ML4. The fourth link string ML4 forms the service area and the guide path connected thereto, which is provided in parallel with the "main road of highway" as the first link string ML1. The second link string ML2 forms the interchange and the guide path connected thereto, which is provided in series with the "main road of highway" as the first link string ML1.

Assuming that the reference number S is "20" per link length of 100 m in the equation (1) under the condition where all the links L that form the first to the fourth link strings ML1 to ML4 belong to the "urban area" section, the numerical range R of a link ID of the link L with the link length of 200 m on the first link string ML1 may be obtained by the following calculation of equation (1).

$$R = (20/100) \times 220 \times 0.3 \times 1 = 13.2$$

In this example, the obtained value is rounded to the numerical range R as the natural number. Accordingly, the obtained numerical range R is "13." In the case where the last number of the link ID of the link L preceding the one connected to the link L is "113," the link ID becomes "114-12."

Under the same condition as described above, the numerical range R of the link ID of a link L with the link length of 100 m in the third link string ML3 may be obtained by the following calculation of equation (1).

$$R = (20/100) \times 100 \times 1 \times 1 = 20$$

In the case where the last number of the link ID of the link L preceding the one connected to the link L is "373," the link ID becomes "373-19."

The numerical range of the link ID is set with respect to at least the road network data Rn1 at the level 1 as the lowest level in accordance with the aforementioned method. The link IDs obtained by combining the link IDs of the links L at the level 1 are then assigned to the road network data Rn2 and Rn3 at the higher levels 2 and 3. The link IDs having the numerical range set in accordance with the link length of the link L and the road attribute to be sequentially arranged in the order of the connection in the link string ML by each of the link strings ML including plural links L which are connected in line may be assigned to the respective links L of the road network data Rn, that is, Rn2 and Rn3 at the higher levels.

The calculation section 3, for example, may be operated in accordance with an application program PG1. The application program PG1 may contain such programs as a display program, a map matching program, a route search program, a guide program, and a retrieving program, which are not shown. The display program may display a current location and a map around a destination on a display screen of the display input section 7, as well as display the current location on the displayed map. The map matching program may execute a map matching process for matching the current location detected by the self location detection section 4 on the map. The route search program may execute route searching for searching a route to the destination input through the display input section 7 from a starting point such as the current location.

The guide program may execute a process for guiding a user along a route with the aid of a route displayed on the display screen on the display input section 7 and voice guidance through the voice output section 8 in accordance with the route to the destination determined by the route search program. The retrieving program may retrieve the destination or any other point for displaying on the map based on the address, phone number, facility name, category, and the like. The operation performed by the navigation device 1 through the calculation section 3 activated based on the aforementioned programs is well known, and the explanation thereof, thus will be omitted. The calculation section 3 activated in accordance with the application program PG1 refers to the road map data RD stored in the map database 2 as the map information.

The memory 5 may store the updating program PG2, which allows the calculation section 3 to execute updating of the road map data RD based on the updating data file Df (see FIG. 7) supplied from a map updating server unit 11 (described later). The updating data file Df may be formed by combining the updating data with respect to the road map data RD stored in the map database 2, as described later. The road map data RD may be updated by replacing the portion of the road map data RD to be updated with the data contained in the updating data file Df.

As discussed above, the self location detection section 4 detects the current location of the navigation device 1. The self location detection section 4 may include a GPS receiver, a directional sensor, and/or a distance sensor (not shown). The information with respect to the coordinate indicating the current location and the traveling direction may be obtained based on the information derived from the aforementioned detectors so as to be output to the calculation section 3.

The display input section 7 may be formed of a display screen, for example, a liquid crystal display unit and the like, and a touch panel or an operation switch operated in conjunction with the display screen. The voice output section 8 may be formed of a speaker and an amplifier. The display input section 7 and the voice output section 8 may be connected to the calculation section 3 so as to display and output a voice in accordance with the operation of the calculation section 3. The display input section 7 may receive the input operation of the user.

The communication section 6 may perform communication with a map updating server unit 11 (described later). The communication section 6 may wirelessly receive and transmit data with a wireless base station 20 (see FIG. 7). For wireless communication, a known communication network, for example, a portable phone network, a wireless LAN (Local Area Network), and the like may be employed.

Figure 7:
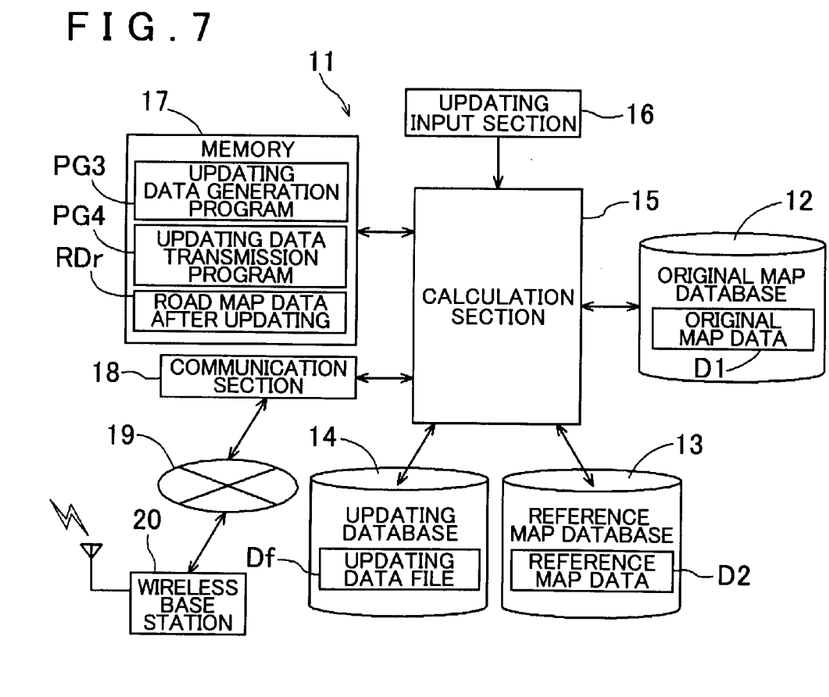
FIG. 7 is a block diagram schematically showing a structure of an exemplary map updating server.

As shown in FIG. 7, the communication section 6 may be structured to be capable of communicating with the map updating server unit 11 via the wireless base station 20 and a communication network 19, such as the internet. The navigation device 1 may be allowed to receive the updating data file Df transmitted from the map updating server unit 11. Preferably the communication section 6 is structured to be allowed to perform wired or wireless communication with the updating terminal owned by the user or the dealer of the navigation device 1, which is not shown in the drawing. The navigation device 1 may be structured to be able to receive the updating data file Df transmitted to the updating terminal via the communication network.

The structure of the map updating server unit 11, which delivers the updating data file Df for updating the road map data RD in the navigation device 1, will be described hereinafter. FIG. 7 is a block diagram schematically showing the structure of the map updating server unit 11. The map updating server unit 11 may generate an updating data file Df based on an original map database 12 (which stores original map data D1 to be updated by the input data from the updating input section 16), and a reference map database 13 (which stores reference map data D2 having the same contents as those of the road map data RD in the map database 2 of the navigation device 1). The map updating server unit 11 may store the generated updating data file Df in an updating database 14 to deliver the updating data file Df to the navigation device 1 upon communication therewith via a communication section 18.

Referring to FIG. 7, the map updating server unit 11 may physically, functionally, and/or physically include the original map database 12, the reference map database 13, the updating database 14, a calculation section 15, an updating input section 16, a memory 17, and/or the communication section 18. The server unit 11 may be formed by at least one of hardware or software (program) using the calculation section 15 formed of the CPU (Central Processing Unit) as the core member.

The original map data D1 stored in the original map database 12 may contain a data structure representing the respective links L for forming the road network data by combining predetermined link IDs and the attribute data. A permanent ID formed of a number, a character, a code, and/or the like, which is irrelevant to the connection order of the link L in the road network data Rn is employed as the link ID for the original map data D1. The attribute data of the respective links L may contain the same information as those of the link L and the node N contained in the aforementioned road map data RD.

The original map data D1 may be updated by the input data from the updating input section 16. The updating input section 16 may include a display unit (e.g., a monitor) and an input device (e.g., a keyboard, a mouse, and/or the like), and may be structured to display the content of the original map data D1 and allow the user to input the new road map information to be updated with the input device while confirming the content of the original map data D1. The user is allowed to update the content of the original map data D1 via the updating input section 16 based on the information with respect to the change in the road derived from field work and/or an aerial photo.

The reference map data D2 stored in the reference map database 13 may have the same contents as those of the road map data RD stored in the map database 2 of the navigation device 1. Likewise the road map data RD, the reference map data D2 may contain the map data at plural levels with the layered structure including the road network data Rn (Rn1 to Rn3) in the map data at the respective levels. The road map data RD, each of the links L in the reference map data D2 may be provided with the link ID having the numerical range set in accordance with the link length of the link L and the road attribute to be sequential in the connection order in a link string ML. The further explanation, which has already been provided above, will be omitted here.

The contents of the reference map data D2 may be updated so as to match the content of the road map data RDr updated based on the updated original map data D1 after generating the updating data file Df. In this way, the content of the reference map data D2 may be constantly maintained to be the same as that of the road map data RD of the navigation device 1.

The updating data file Df stored in the updating database 14 may be formed by combining the updating portion of the road map data RD stored in the map database 2 into a single file. The updating data file Df may be generated by the calculation section 15 operated in accordance with an updating data generation program PG3 stored in the memory 17. The updating data file Df may be formed as an extracted difference data file through the comparison between the updated road map data RDr generated based on the original map data D1 and the reference map data D2 stored in the reference map database 13.

The calculation section 15 may execute the updating data generation program PG3 and the updating data transmission program PG4 stored in the memory 17. The updating data generation program PG3 may generate the updating data file Df based on the updated original map data D1 and the reference map data D2 upon updating of the original map data D1. The updating data transmission program PG4 may transmit the updating data file Df generated in accordance with the updating data generation program PG3 to the navigation device 1.

The communication section 18 functions to communicate with the navigation device 1. The communication section 18 is structured to be able to communicate with the navigation device 1 via the communication network 19 such as the Internet and the wireless base station 20. The communication section 18 is allowed to transmit the updating data file Df to the navigation device 1.

Examples of a process for operating the calculation section 15 executed in the map updating server unit 11 in accordance with the updating data generation program PG3 and the updating data transmission program PG4 will be described referring to the flowcharts shown in FIGS. 8 and 9. That is, examples of methods that may be implemented by the data generation program PG3 and the data transmission program PG4 are shown the flowcharts shown in FIGS. 8 and 9. The exemplary methods may be implemented, for example, by one or more components of the above-described navigation device 1 and/or server unit 11. However, even though the exemplary structure of the above-described navigation device 1 and/or server unit 11 may be referenced in the description, it should be appreciated that the structure is exemplary and the exemplary methods need not be limited by any of the above-described exemplary structure.

Figure 8:
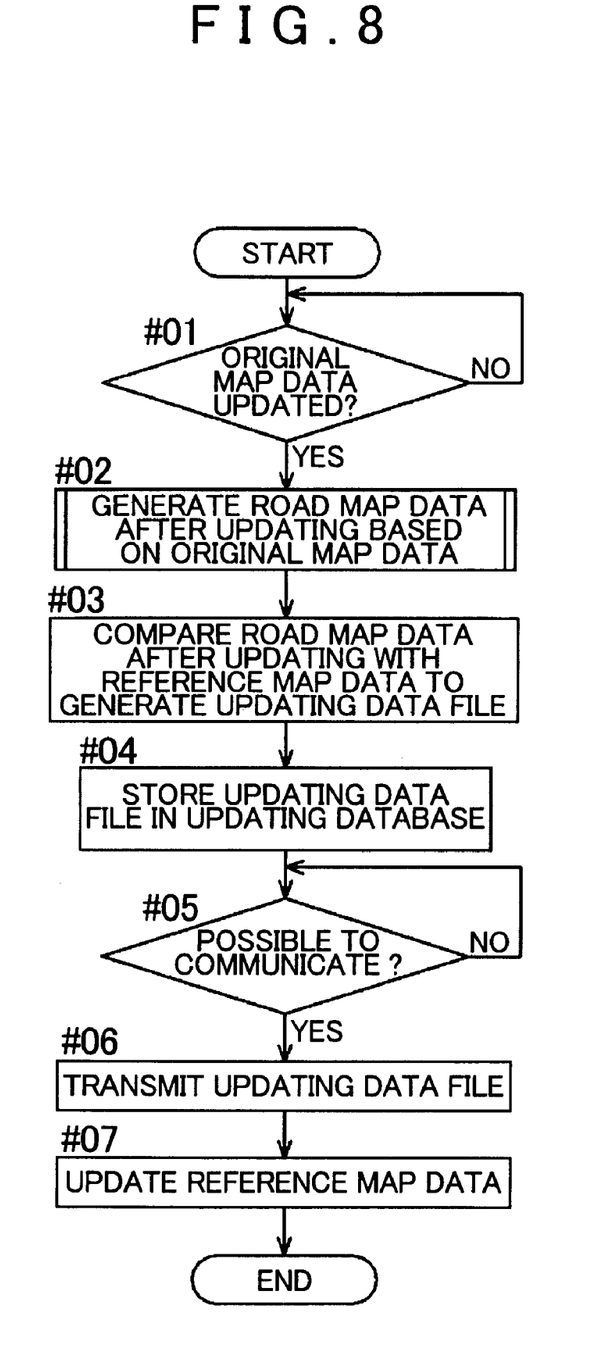
FIG. 8 is a flowchart showing an exemplary method for generating and transmitting update data.
Figure 9:
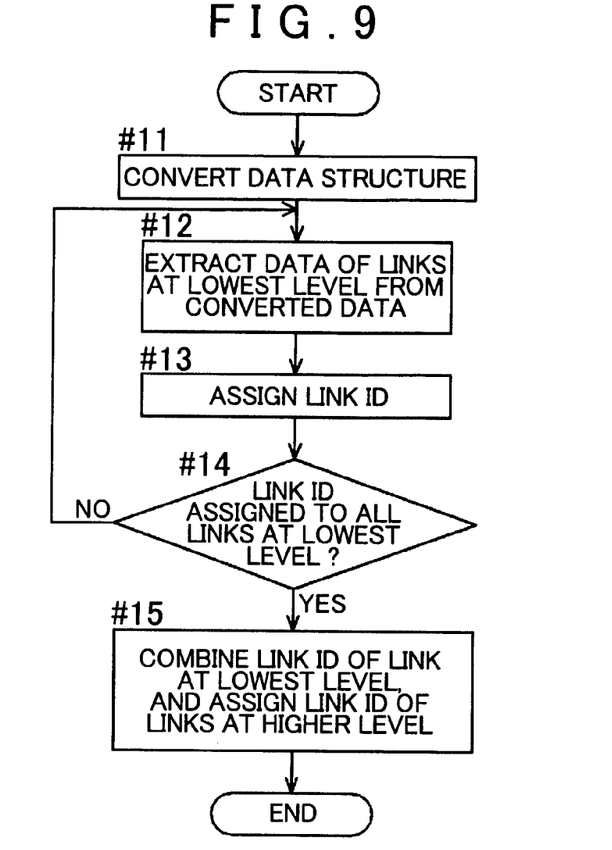
FIG. 9 is a flowchart showing an exemplary method for generating road map data after updating.

FIG. 8 shows a flowchart representing the a method for operating the calculation section 15 in accordance with the updating data generation program PG3 and the updating data transmission program PG4. FIG. 9 shows a flowchart representing a method for generating the road map data RDr after updating in step #02 in FIG. 8.

As shown in FIG. 8, when the original map data D1 is updated upon reception of the input data from the updating input section 16 (Yes in step #01), the calculation section 15 generates the road map data RDr after updating based on the original map data D1 in accordance with the updating data generation program PG3. The detailed explanation of the process in step #02 will be described later referring to the flowchart shown in FIG. 9.

The generated road map data RDr after updating are the same as the reference map data D2 and the road map data RD stored in the map database 2 of the navigation device 1, as well as the same format except that they are updated in accordance with the updated content of the original map data D1.

The updated road map data RDr generated in step #02 is temporarily stored in the memory 17. The calculation section 15 makes a comparison between the updated road map data RDr and the reference map data D2 stored in the reference map database 13 in accordance with the updating data generation program PG3 to generate the updating data file Df (step #03).

Specifically, the updated road map data RDr and the reference map data D2 have the common data contents except the difference between data before and after updating of the original map data D1. The difference data of the updated road map data RDr in reference to the reference map data D2 is thus extracted and combined to generate the updating data file Df.

The calculation section 15 stores the updating data file Df generated in step #03 in the updating database 14 (step #04). Then it is determined whether it is possible to communicate between the communication section 18 and the navigation device 1 (step #05). When it is determined that the communication is possible (Yes in step #05), the calculation section 15 transmits the updating data file Df to the navigation device 1 via the communication section 18 (step #06). Then the calculation section 15 updates the reference map data D2 based on the updated road map data RDr (step #07) and the process performed in the map updating server unit 11 ends. Upon reception of the updating data file Df, the navigation device 1 allows the calculation section 3 to be operated in accordance with the updating program PG2 for updating the road map data RD in the map database 2 (see FIG. 1).

The process for generating the road map data RDr updated in step #02 will be described in detail referring to the flowchart shown in FIG. 9. The calculation section 15 first converts the data structure of the original map data D1 into the same structure as the road map data RD, that is, the structure having the map data at plural levels and layered structure of the road network data Rn (Rn1 to Rn3) for the map data at the respective levels in accordance with the updating data generation program PG3 (step #11). The data of the respective links L at the lowest level 1 are extracted from the converted data (step #12). The link IDs are assigned to the respective extracted links L (step #13). Specifically, the extracted link L is provided with the link ID with the numerical range set in accordance with the link length of the link L and the road attribute and set to be sequential in the connection order in the link string ML at each link string having plural links L connected in line as the exclusive ID (identifier) for identification without being overlapped, as described above. The new link IDs generated by dividing the link IDs before updating is assigned as that of the links L to be divided by updating the road network data Rn resulting from the updating of the original map data D1. As for any link L which does not change with respect to the reference map data D2, the same link ID as that of the reference map data D2 may be used for the updated road map data RDr.

Figure 10:
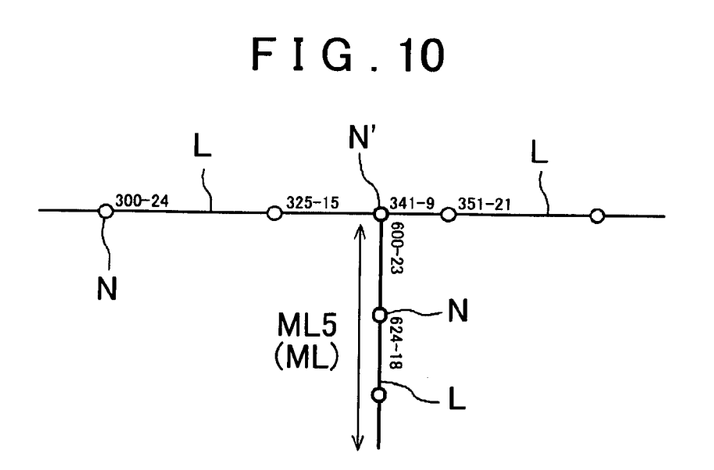
FIG. 10 is a view showing an exemplary setting of the link ID.

FIG. 10 shows the exemplary case where a new node N' and a link string ML5 are added to the existing link L with the link ID of "325-25" shown in FIG. 4. In the aforementioned case, it is preferable to divide the link ID of the existing link L to generate the respective link IDs for the divided links L. The numerical range R of the link ID of the divided link L is obtained by calculation of the aforementioned equation (1). For example, in the case where the existing link L with the link length of 130 m, the numerical range R of "26," and the link ID of "325-25" shown in FIG. 4 is divided into the former section of the link string ML (left side shown in FIGS. 4 and 10) with the length of 80 m, and the latter section (left side shown in FIGS. 4 and 10) with the length of 50 m, the link ID may be set in the following manner. Under the condition where the reference number S in the equation (1) is "20" per the link length of 100 m, and all the links L which form the fourth link string ML1 belong to the "urban area" section, the numerical range R of the link ID for the link L with the link length of 80 m after the division may be obtained as follows:

$$R=(20/100) \times 80 \times 1 \times 1 = 16$$

As the numerical range R of the link ID prior to the division is "26," the numerical range R of the link ID of the link L with the link length of 50 m after the division becomes "10." The former side of the link ID after division becomes "325-15" and the latter side of the link ID becomes "341-9" as shown in FIG. 10. The links L which form the added link string ML5 are set such that the link IDs which are not overlapped with those of the links L which form the existing link strings ML1 to ML4 are sequentially arranged in the connection order in the link string ML5. In this case, "600-23" and "624-18" are set as the link ID as the example.

Referring back to FIG. 9, after the link IDs are assigned to the respective links L (step #13), it is determined whether the link IDs have been assigned to all the links L at the level 1 as the lowest level (step #14). The process in steps #12 and #13 will be repeatedly executed (No in step #14) until the link IDs are assigned to all the links L at the level 1. When the link IDs have been assigned to all the links L at the level 1 (Yes in step #14), the link IDs of the links L at the level 1 as the lowest level are combined, and the link IDs for the respective links at the levels 2 and 3 as the higher levels are assigned (step #15). After the link IDs are assigned to all the links L contained in the road map data RD, the process for generating the road map data RDr after updating ends.

In the aforementioned examples, the category attribute with respect to the road category in the respective links and the area attribute with respect to the area where the respective links exist are employed as the road attribute for setting the numerical range of the link ID. However, for example, either the category attribute or the area attribute may only be employed as the road attribute for setting the numerical range of the link ID. Also a road attribute other than the category attribute and the area attribute may be employed for setting the numerical range of the link ID.

In the aforementioned examples, three sections of "main road of highway," "side road of highway," and "general road" are employed as the category attribute sections with respect to the category attribute, and two sections of "urban area" and "local area" are employed as the area attribute sections with respect to the area attribute. However, the specific sections of the category attribute and the area attribute may be set depending on the possibility of dividing the link L by updating of the road network data Rn. The values of the category attribute coefficient Ca and the area attribute coefficient Cb may be appropriately set depending on the possibility of dividing the link L resulting from updating of the road network data Rn as well.

In the aforementioned examples, the link ID is expressed as the combination of the first number of the subject link ID and the difference between the first and the last numbers of the link ID. The structure of the link ID need not be limited to the one as described above. The link ID may be expressed as the combination of the first and the last numbers of the numerical range such as "100-113," "114-126," "127-136" and the like.

In the aforementioned examples, updating version with respect to the reference map data D2 and the updating data file Df are not described. In the case where the road map data RD of plural navigation devices 1 are updated, data of plural versions that contain the reference map data D2 and the updating data file Df of the old version may be stored in the reference map database 13 and the updating database 14, respectively depending on each updating state of the respective navigation devices 1. There may be the case where all the plural navigation devices 1 do not communicate with the map updating server unit 11 frequently, in other words, one of the navigation devices 1 may have the old road map data without being updated, and the other may have the road map data RD updated by the latest updating data file Df.

Each of the road map data RD, the reference map data D2 and the updating data file Df may thus be provided with the version information for the purpose of updating the road map data RD of all the navigation devices 1. The updating data file Df with the version newer than that of the road map data RD of the navigation device 1 may be employed for updating the old road map data RD. This makes it possible to appropriately update the road map data RD depending on each updating state of the respective navigation devices 1.

In the aforementioned examples, the structure of the road map data RD is applied to the road map data of the navigation device 1. However, the structure is equally applicable to road map data for other uses, for example, a map database for retrieving the destination.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A computer-implemented method of creating a road map data structure, the data structure including road network data in which a road is represented by a plurality of links connected in a link string, the method comprising:
   assigning a link ID to each of the links of the road network data;
   wherein, for each link:
      the link ID has a numerical range set in accordance with a road attribute; and
      the link ID is set sequentially in a connection order within the link string.

2. The method according to claim 1, wherein for each link, the link ID has a numerical range set in accordance with both a length of the link and the road attribute.

3. The method according to claim 2, wherein the numerical range of the link ID is set by multiplying the link length of the link by an attribute coefficient, the attribute coefficient determined based on the road attribute.

4. The method according to claim 2, wherein the road attribute includes at least one of:
   a category attribute that represents a road category of the link; and
   an area attribute that represents area where the link exists.

5. The method according to claim 4, wherein the numerical range of the link ID is set by multiplying the link length of the link by an attribute coefficient, the attribute coefficient determined based on the road attribute.

6. The method according to claim 5, wherein the attribute coefficient is preliminarily set for each of a plurality of attribute sections that are defined based on the road attribute, the attribute coefficient for each attribute section being set based on a likelihood that the links within the attribute section will be divided when the road network data is updated.

7. The method according to claim 6, wherein:
   the attribute sections include an urban area section and a local area section; and
   the attribute coefficient of the urban area section is larger than the local area section.

8. The method according to claim 6, wherein:
   the attribute sections include a highway section, a side road of highway section, and a general road section; and
   the attribute coefficient of the general road section is larger than the side road of highway section and the side road of highway section is larger than the highway section.

9. The method according to claim 1, wherein:
   the road attribute for each link comprises a category attribute that represents a road category of the link;
   the category attribute is selected from a group including highway and general road; and
   the numerical range of the link ID for a link having the category attribute of highway is set to be larger than the numerical range of the link ID for a link having the category attribute of general road.

10. The method according to claim 1, wherein:
   the road attribute for each link comprises an area attribute that represents an area where the link is located;
   the area attribute is selected from a group including urban area and local area; and
   the numerical range of the link ID for a link having the area attribute of urban is set to be larger than the numerical range of the link ID for a link having the area attribute of rural.

11. A computer-readable storage medium storing a road map data structure creating program executable by a computer, the data structure including road network data in which a road is represented by a plurality of links connected in a link string, the program comprising:
   instructions for assigning a link ID to each of the links of the road network data;
   wherein, for each link:
      the link ID has a numerical range set in accordance with a road attribute; and
      the link ID is set sequentially in a connection order within the link string.

12. The storage medium according to claim 11, wherein for each link, the link ID has a numerical range set in accordance with both a length of the link and the road attribute.

13. The storage medium according to claim 12, wherein the numerical range of the link ID is set by multiplying the link length of the link by an attribute coefficient, the attribute coefficient determined based on the road attribute.

14. The storage medium according to claim 12, wherein the road attribute includes at least one of:
   a category attribute that represents a road category of the link, and
   an area attribute that represents area where the link exists.

15. The storage medium according to claim 14, wherein the numerical range of the link ID is set by multiplying the link length of the link by an attribute coefficient, the attribute coefficient determined based on the road attribute.

16. The storage medium according to claim 15, wherein the attribute coefficient is preliminarily set for each of a plurality of attribute sections that are defined based on the road attribute, the attribute coefficient for each attribute section being set based on a likelihood that the links within the attribute section will be divided when the road network data is updated.

17. The storage medium according to claim 16, wherein:
   the attribute sections include an urban area section and a local area section; and
   the attribute coefficient of the urban area section is larger than the local area section.

18. The storage medium according to claim 16, wherein:
the attribute sections include a highway section, a side road of highway section, and a general road section; and
the attribute coefficient of the general road section is larger than the side road of highway section and the side road of highway section is larger than the highway section.

19. The storage medium according to claim 11, wherein:
the road attribute for each link comprises a category attribute that represents a road category of the link;
the category attribute is selected from a group including highway and general road; and
the numerical range of the link ID for a link having the category attribute of highway is set to be larger than the numerical range of the link ID for a link having the category attribute of general road.

20. The storage medium according to claim 11, wherein:
the road attribute for each link comprises an area attribute that represents an area where the link is located;
the area attribute is selected from a group including urban area and local area; and
the numerical range of the link ID for a link having the area attribute of urban is set to be larger than the numerical range of the link ID for a link having the area attribute of rural.

21. A navigation device that creates a road map data structure, the device comprising:
a memory that stores the road map data structure, the data structure including road network data in which a road is represented by a plurality of links connected in a link string; and
a controller that assigns a link ID to each of the links of the road network data;
wherein, for each link:
the link ID has a numerical range set in accordance with a road attribute; and
the link ID is set sequentially in a connection order within the link string.

22. The navigation device according to claim 21, further comprising a receiver that receives an update file from a navigation server, wherein, for at least each new link in the update file, the controller:
sets the link ID as a numerical range set in accordance with a road attribute;
assigns the link ID to the link so that the link ID is set sequentially in a connection order within the link string; and
stores the link ID in the road map data structure.

23. The navigation device according to according to claim 22, wherein for at least each new link in the update file, the controller, sets the link ID as a numerical range set in accordance with both a length of the link and the road attribute.

24. The navigation device according to according to claim 21, wherein for each link, the link ID has a numerical range set in accordance with both a length of the link and the road attribute.

25. The navigation device according to according to claim 21, wherein:
the road attribute for each link comprises a category attribute that represents a road category of the link;
the category attribute is selected from a group including highway and general road; and
the numerical range of the link ID for a link having the category attribute of highway is set to be larger than the numerical range of the link ID for a link having the category attribute of general road.

26. The navigation device according to according to claim 21, wherein:
the road attribute for each link comprises an area attribute that represents an area where the link is located;
the area attribute is selected from a group including urban area and local area; and
the numerical range of the link ID for a link having the area attribute of urban is set to be larger than the numerical range of the link ID for a link having the area attribute of rural.

* * * * *